United States Patent
Macias et al.

(10) Patent No.: US 8,805,364 B2
(45) Date of Patent: Aug. 12, 2014

(54) USER EQUIPMENT ATTACHMENT/DETACHMENT FROM A LONG TERM EVOLUTION (LTE) NETWORK

(75) Inventors: John F Macias, Antelope, CA (US); Patricia Chang, San Ramon, CA (US); Maria G Lam, Irvine, CA (US); Scott Anthony Townley, Gilbert, AZ (US); Derek Hongwei Bao, Concord, CA (US); Phillip Andrew Ritter, Danville, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 611 days.

(21) Appl. No.: 12/471,263

(22) Filed: May 22, 2009

(65) Prior Publication Data

US 2010/0297995 A1   Nov. 25, 2010

(51) Int. Cl.
*H04W 88/02* (2009.01)

(52) U.S. Cl.
USPC ........................................ 455/435.1

(58) Field of Classification Search
USPC .............. 455/432, 434, 435.1–435.3, 436, 455/438–439; 370/351–356
See application file for complete search history.

(56) References Cited

U.S. PATENT DOCUMENTS

| | | | |
|---|---|---|---|
| 2002/0018446 A1 | 2/2002 | Huh et al. | |
| 2003/0036392 A1* | 2/2003 | Yukie | 455/461 |
| 2008/0102832 A1 | 5/2008 | Sengupta et al. | |
| 2009/0046632 A1* | 2/2009 | Nanda et al. | 370/328 |
| 2009/0047931 A1 | 2/2009 | Nanda et al. | |
| 2009/0116434 A1 | 5/2009 | Lohr et al. | |

\* cited by examiner

*Primary Examiner* — Diane Mizrahi

(57) ABSTRACT

A device searches for a primary access network, and acquires the primary access network. The device also requests a service provided by a network connected to the primary access network, and attaches to the primary access network only when the service is requested by the device.

23 Claims, 15 Drawing Sheets

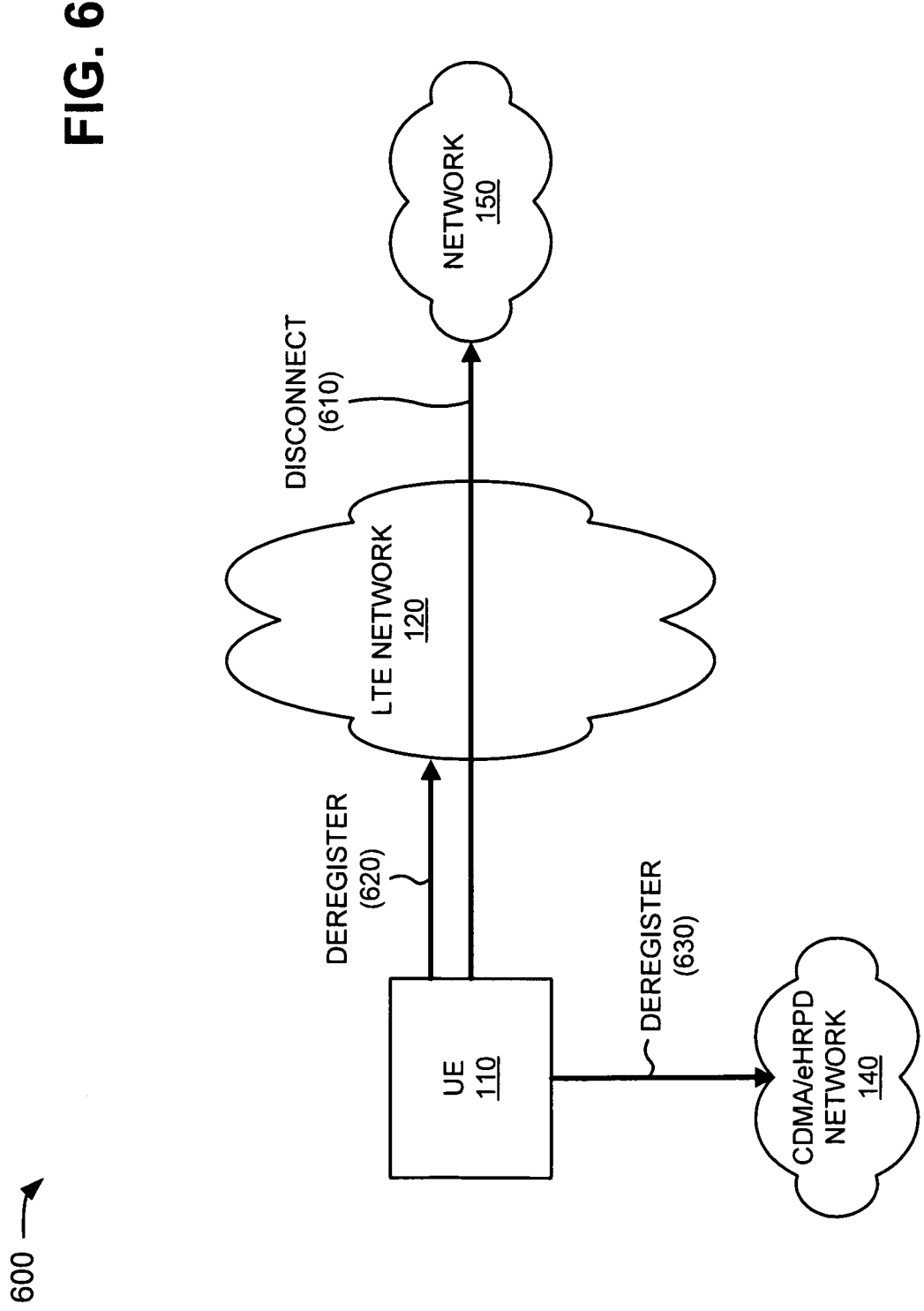

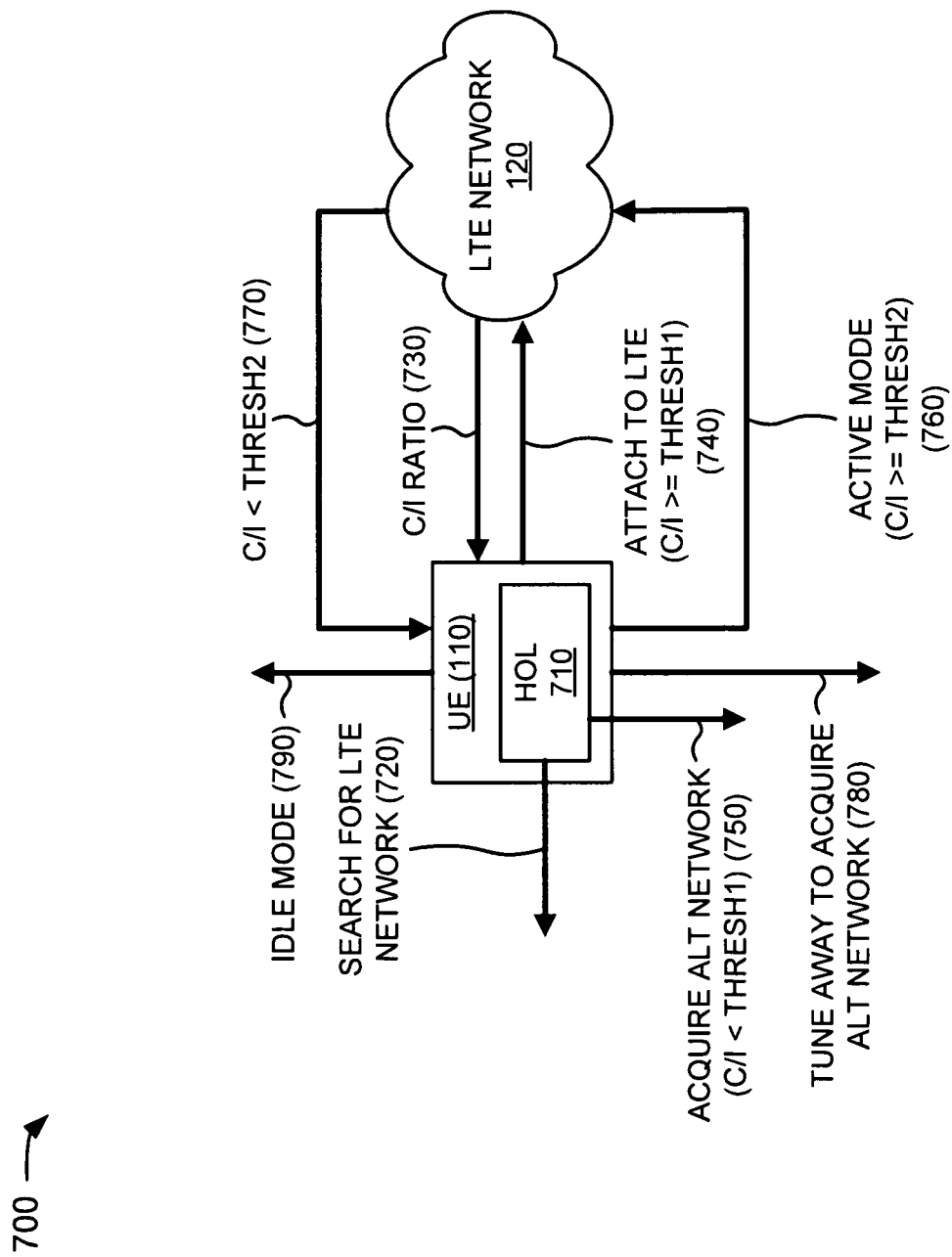

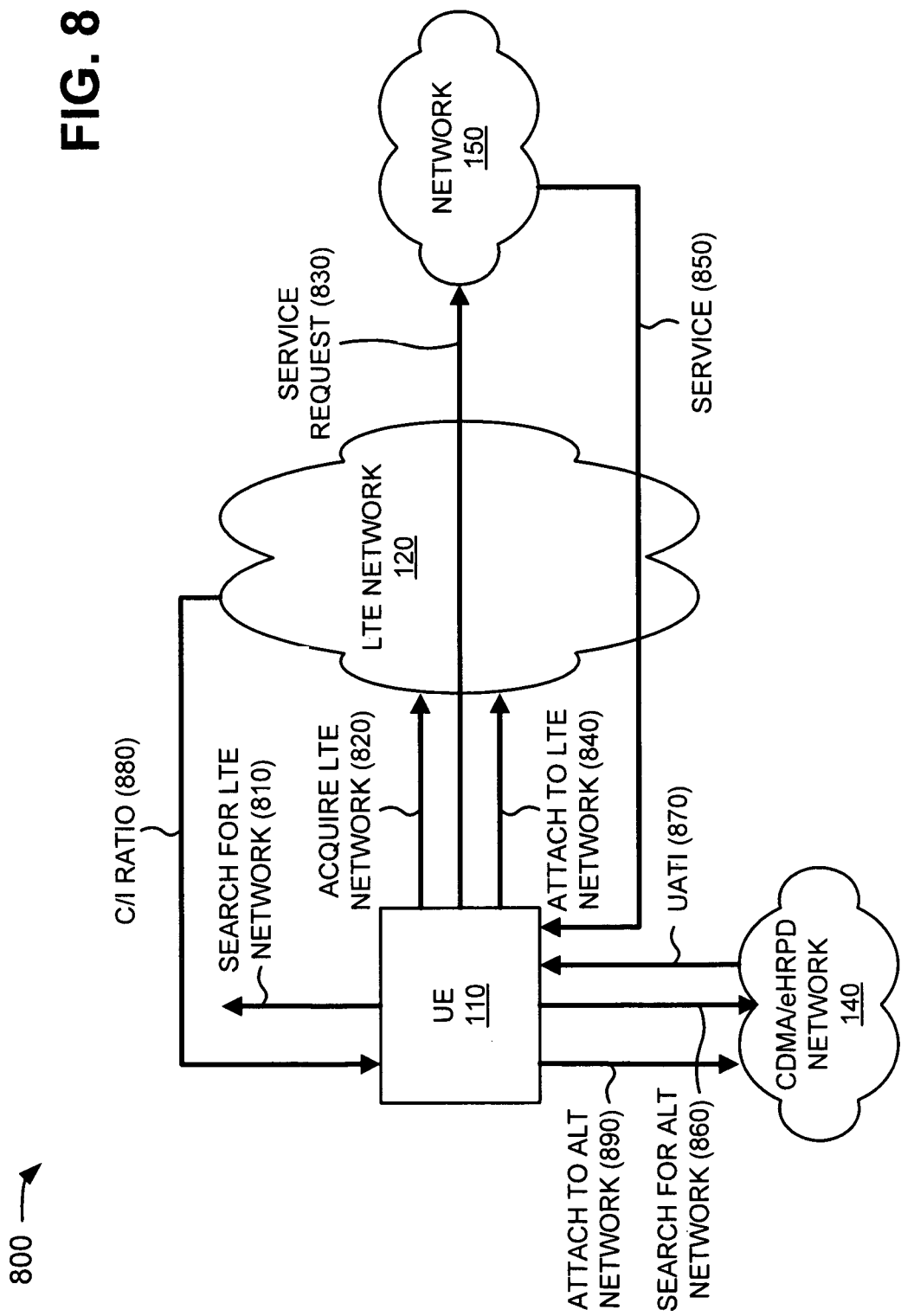

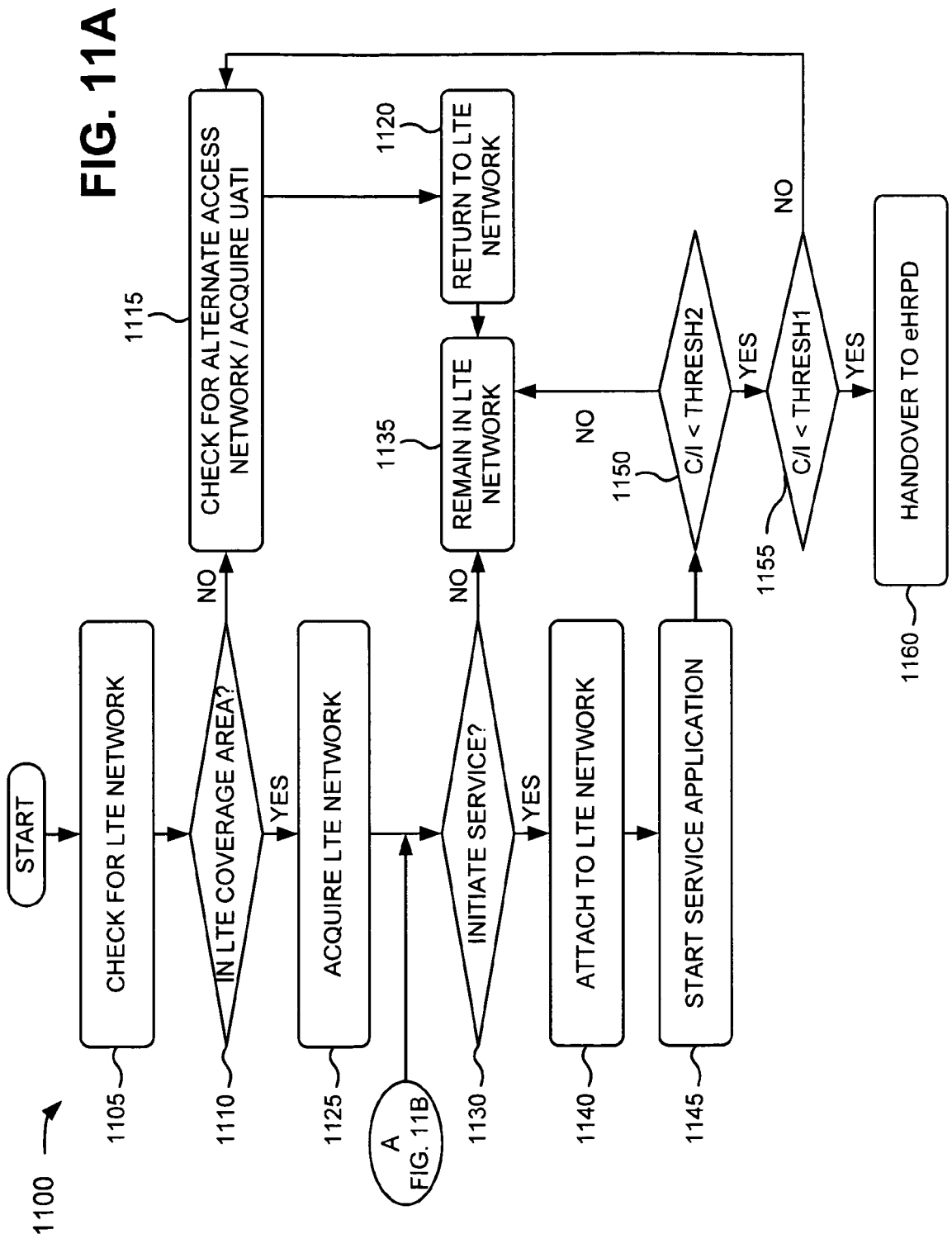

USER EQUIPMENT ATTACHMENT/DETACHMENT FROM A LONG TERM EVOLUTION (LTE) NETWORK

BACKGROUND

The Third Generation Partnership Project (3GPP) is standardizing a first release of a Long Term Evolution (LTE) concept. An LTE system or network may include a number of base stations (also referred to as "Node Bs") connected to one or more mobility management entities/serving gateways (MME/S-GWs). A number of nodes (e.g., a network management system (NMS) node, an operation and support system (OSS) node, etc.) may provide operation and maintenance functionality for the base stations and/or the MME/S-GWs. In LTE, a downlink is based on orthogonal frequency division multiplexing (OFDM), while an uplink is based on a single carrier modulation method known as discrete Fourier transform spread OFDM (DFT-S-OFDM). During initial access, user equipment (UE) (e.g., a wireless telephone, personal digital assistant (PDA), etc.) seeks access to a network (e.g., a radio network) in order to register and commence services. A LTE random access (RA) procedure serves as an uplink control procedure to enable the UE to access the LTE network.

The LTE network may provide access to a variety of other networks, such as the Internet, Internet Protocol (IP) Multimedia Subsystem (IMS) networks, the Public Switched Telephone Network (PSTN), etc. In the LTE standard, when the user equipment is powered on it automatically attaches to the LTE network (i.e., the base stations, MME/S-GWs, etc.) even if there is no activity (e.g., a request for a service, a communication, etc.) from a user of the user equipment. Such unnecessary LTE network connectivity consumes and wastes resources associated with the LTE network.

BRIEF DESCRIPTION OF THE DRAWINGS

FIG. 6 illustrates a diagram of exemplary interactions among components of another exemplary portion of the network depicted in FIG. 1;

FIG. 7 depicts a diagram of exemplary interactions among components of still another exemplary portion of the network illustrated in FIG. 1;

FIG. 8 illustrates a diagram of exemplary interactions among components of a further exemplary portion of the network depicted in FIG. 1;

FIGS. 11A and 11B depict flow charts of still another exemplary process for detecting, selecting, acquiring, and maintaining attachment with a LTE network according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may provide systems and/or methods that enable user equipment to attach to an access system (e.g., a LTE network) only when the user equipment attempts to perform some activity via the LTE network (e.g., access the Internet, request a service via the Internet, etc.). Such an arrangement may prevent consumption and waste of resources (e.g., MME/S-GWs, base stations, etc.) associated with unnecessary access of the LTE network. The systems and/or methods may reduce access system acquisition time and may ensure accessibility to fallback access systems (e.g., code division multiple access (CDMA) systems).

Figure 1:
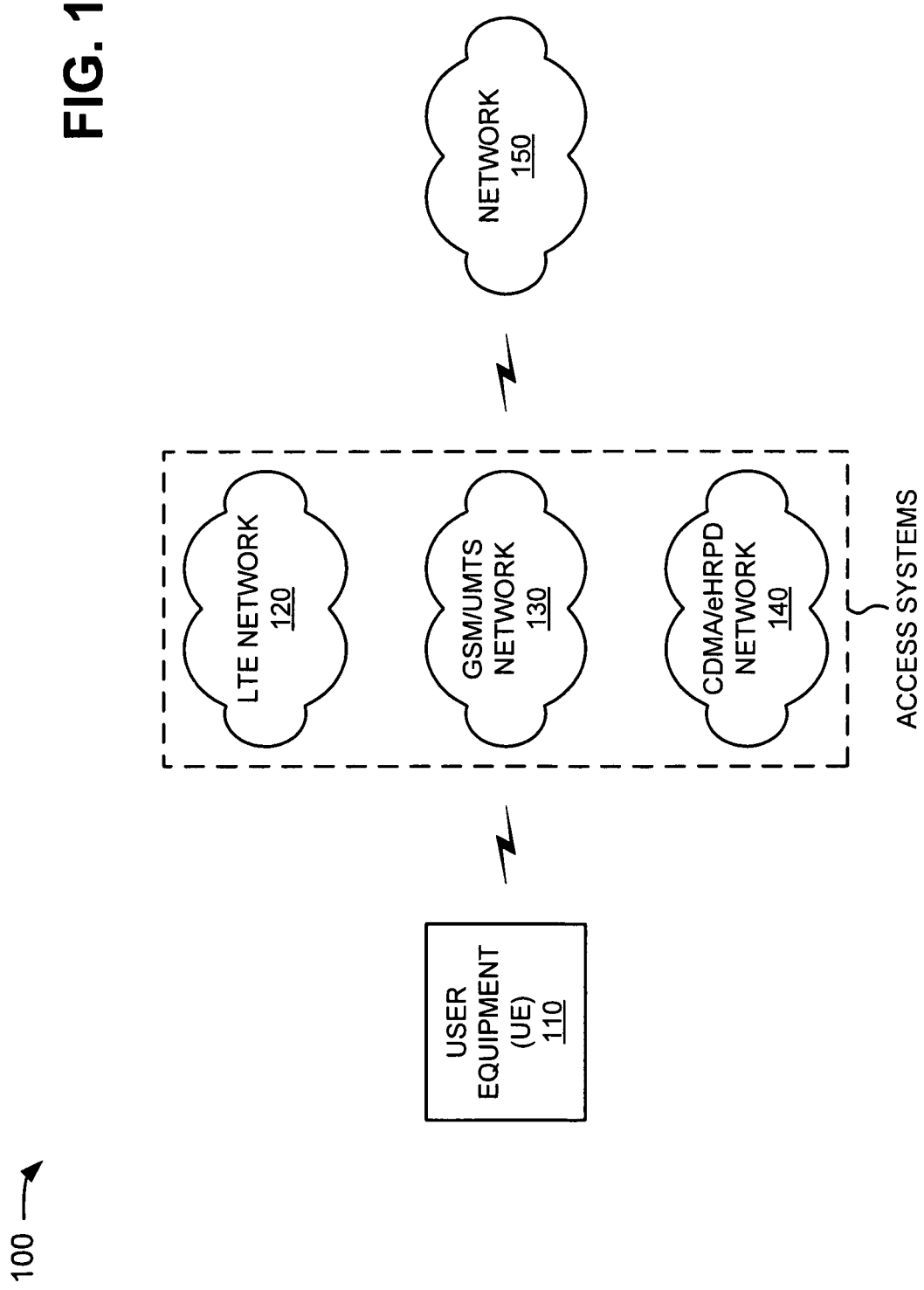
FIG. 1 depicts a diagram of an exemplary network in which systems and/or methods described herein may be implemented.

FIG. 1 depicts a diagram of an exemplary network 100 in which systems and/or methods described herein may be implemented. As shown, network 100 may include user equipment (UE) 110, a group of access systems (e.g., a LTE network 120, a Global System for Mobile communications (GSM)/Universal Mobile Telecommunications System (UMTS) network 130, and a CDMA/evolved high rate packet data (eHRPD) network 140), and a network 150. Components of network 100 may interconnect via wired and/or wireless connections. A single user equipment 110, LTE network 120, GSM/UMTS network 130, CDMA/eHRPD network 140, and network 150 have been illustrated in FIG. 1 for simplicity. In practice, there may be more UEs 110, LTE networks 120, GSM/UMTS networks 130, CDMA/eHRPD networks 140, and/or networks 150. Also, in some instances, a component in network 100 (e.g., one or more of user equipment 110, LTE network 120, GSM/UMTS network 130, CDMA/eHRPD network 140, and network 150) may perform one or more functions described as being performed by another component or group of components in network 100.

User equipment 110 may include one or more devices capable of sending/receiving voice and/or data to/from network 150 via one or more of the access systems. User equipment 110 may include, for example, a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, etc.

In one implementation, user equipment 110 may reference a higher order list (HOL) of radio access technologies (RATs) or access systems, such as LTE, GSM, CDMA, etc. The HOL may include two lists (e.g., one list containing a preferred roaming list for single carrier radio transmission technology (1XRTT) and HRPD, and another list that includes a public land mobile network (PLMN) for GSM, UMTS, and LTE). The HOL may permit user equipment 110 to switch back and forth between the two lists. User equipment 110 may use the HOL to determine access system selection, and may connect with a selected access system. The ability to maintain a connection with the selected access system may be subject to a state of user equipment 110 and radio frequency conditions.

LTE network 120 may include one or more devices for transmitting voice and/or data to user equipment 110 and network 150. For example, LTE network 120 may include a number of base stations (Node Bs) connected to one or more MME/S-GWs. A number of nodes (e.g., a NMS node, an OSS node, etc.) may provide operation and maintenance functionality for the base stations and/or the MMEs/S-GWs. LTE network 120 may include an evolved UMTS terrestrial radio access network (E-UTRAN) air interface. LTE network 120 may include any IP network, such as Worldwide Interoperability for Microwave Access (WiMAX) networks, WiFi networks, and wired networks. The E-UTRAN interface may use OFDMA for the downlink and a single carrier FDMA (SC-FDMA) for the uplink and may employ multiple-input and multiple-output (MIMO) (e.g., with up to four antennas per base station). Further details of LTE network 120 are provided below in connection with, for example, FIG. 2.

GSM/UMTS network 130 may include a cellular network that includes one or more base stations to which user equipment (e.g., mobile phones) may connect. GSM/UMTS network 130 may include five different cell sizes (e.g., macro, micro, pico, femto, and umbrella cell sizes), where a coverage area of each cell may vary according to an implementation environment. In one implementation, GSM/UMTS 130 may include one or more devices for transmitting voice and/or data to user equipment 110 and network 150. For example, GSM/UMTS 130 may include a group of base stations and a group of radio network controllers (RNCs). The base stations may include one or more devices that receive voice and/or data from the RNCs and transmit that voice and/or data to user equipment 110 via an air interface (e.g., a W-CDMA air interface). The base stations may also include one or more devices that receive voice and/or data from user equipment 110 over an air interface and transmit that voice and/or data to the RNCs or other user equipment 110.

The RNCs may include one or more devices that control and manage the base stations, and that perform user data processing to manage utilization of radio network services. The RNCs may transmit/receive voice and data to/from the base stations, other RNCs, and/or network 150. Each RNC may act as a controlling RNC (CRNC), a drift RNC (DRNC), or a serving RNC (SRNC). A CRNC is responsible for controlling the resources of a base station. On the other hand, an SRNC serves a particular user equipment 110 and manages the connections towards that user equipment 110. Likewise, a DRNC fulfills a similar role to the SRNC (e.g., may route traffic between a SRNC and a particular user equipment 110).

CDMA/eHRPD network 140 may include one or more devices for transmitting voice and/or data to user equipment 110 and network 150. For example, CDMA/eHRPD network 140 may include a group of base stations and a group of RNCs, as described above in connection with GSM/UMTS network 130. CDMA/eHRPD network 140 may use CDMA (e.g. a multiple access scheme for digital radio) to send voice, data, and signaling data (e.g., a dialed telephone number) between user equipment 110 and base stations. In one implementation, CDMA/eHRPD network 140 may include a CDMA HRPD air interface and may support concurrent services functionality for packet data and circuit switched voice communication.

Network 150 may include a local area network (LAN), a wide area network (WAN), a metropolitan area network (MAN), an intranet, the Internet, a PLMN, a telephone network, such as the PSTN or a cellular telephone network, an IMS network, or a combination of networks. In one implementation, network 150 may provide voice services (e.g., voice over IP (VoIP) services) and data services (e.g., video streaming, music downloading, mobile television, etc.) to user equipment 110, via one or more of the access systems (e.g., via one of more of LTE network 120, GSM/UMTS network 130, and CDMA/eHRPD network 140).

Figure 2:
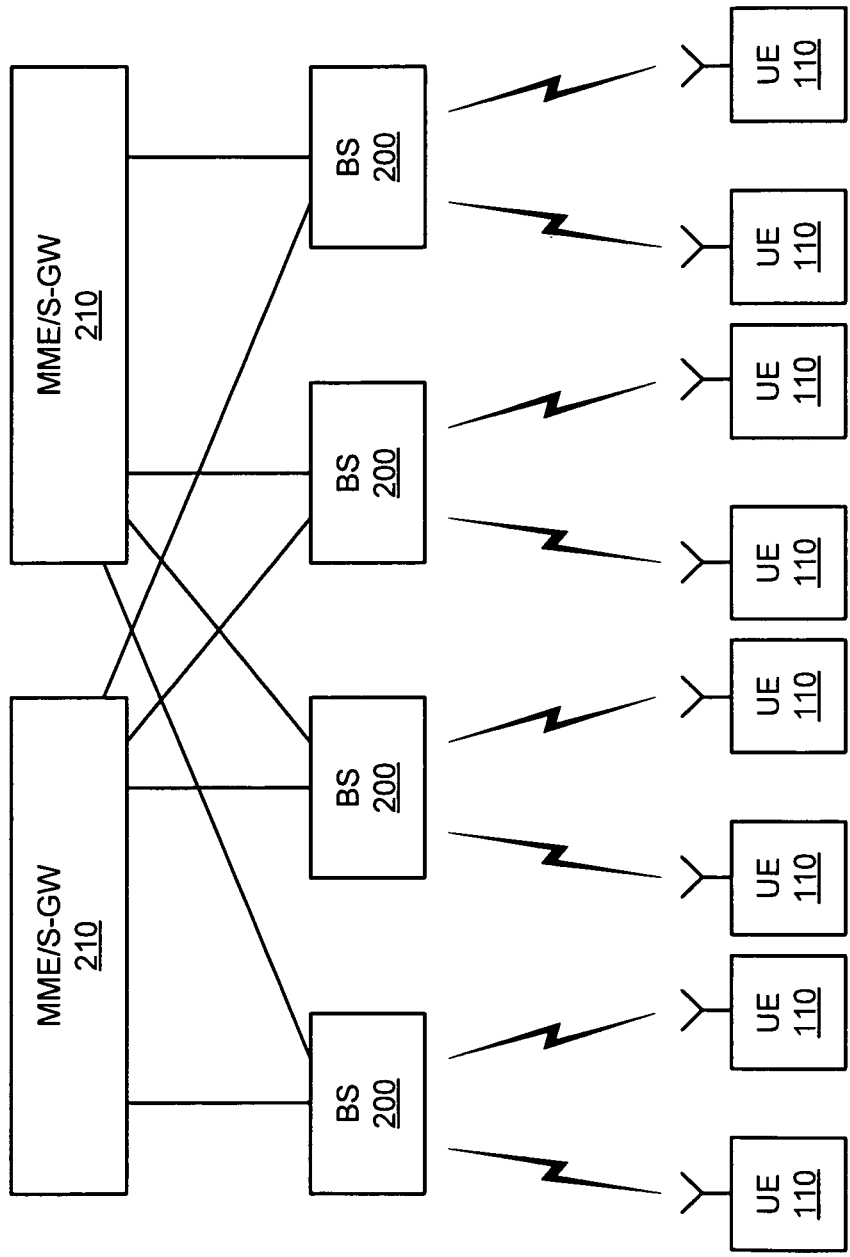
FIG. 2 illustrates a diagram of exemplary components of a Long Term Evolution (LTE) network depicted in FIG. 1.

FIG. 2 illustrates a diagram of exemplary components of LTE network 120. As shown, LTE network 120 may include a group of user equipment (UE) 110 (referred to collectively, and in some instances individually, as "user equipment 110"), a group of base stations (BSs) 200 (referred to collectively as "base stations 200" and in some instances, individually as "base station 200"), and two a mobility management entity/serving gateways (MME/S-GWs) 210 (referred to individually as "MME/S-GW 210"). Eight pieces of user equipment 110, four base stations 200, and two MME/S-GWs 210 have been illustrated in FIG. 2 for simplicity. In practice, there may be more UEs 110, base stations 200, and MME/S-GWs 210. Also, in some instances, a component in LTE network 120 (e.g., one or more of user equipment 110, base stations 200, and MME/S-GWs 210) may perform one or more functions described as being performed by another component or group of components in LTE network 120. User equipment 110 may include the features described above in connection with, for example, FIG. 1.

Base station 200 may include one or more devices that receive voice and/or data from MME/S-GWs 210 and transmit that voice and/or data to user equipment 110 via an air interface. Base station 200 may also include one or more devices that receive voice and/or data from user equipment 110 over an air interface and transmit that voice and/or data to MME/S-GWs 210 or other user equipment 110.

MME/S-GW 210 may include one or more devices that control and manage base stations 200. MME/S-GW 210 may route and forward user data packets, act as a mobility anchor for the user plane during inter-base station handovers, and act as an anchor for mobility between LTE and other 3GPP technologies. For idle state user equipment, MME/S-GW 210 may terminate a downlink data path and may trigger paging when downlink data arrives for user equipment 110. MME/S-GW 210 may manage and store user equipment contexts (e.g., parameters of an IP bearer service, network terminal routing information, etc.), and may perform replication of user traffic in case of lawful interception. MME/S-GW 210 may provide an idle mode user equipment tracking and paging procedure that includes retransmissions. MME/S-GW 210 may be involved in a bearer activation/deactivation process and may be responsible for choosing a serving gateway for user equipment 110 at an initial connection and at a time of intra-LTE handover. MME/S-GW 210 may be responsible for authenticating a user and for generating and allocating temporary identities to user equipment 110. MME/S-GW 210 may check for authorization of user equipment to camp on a service provider's PLMN and may enforce roaming restrictions.

Figure 3:
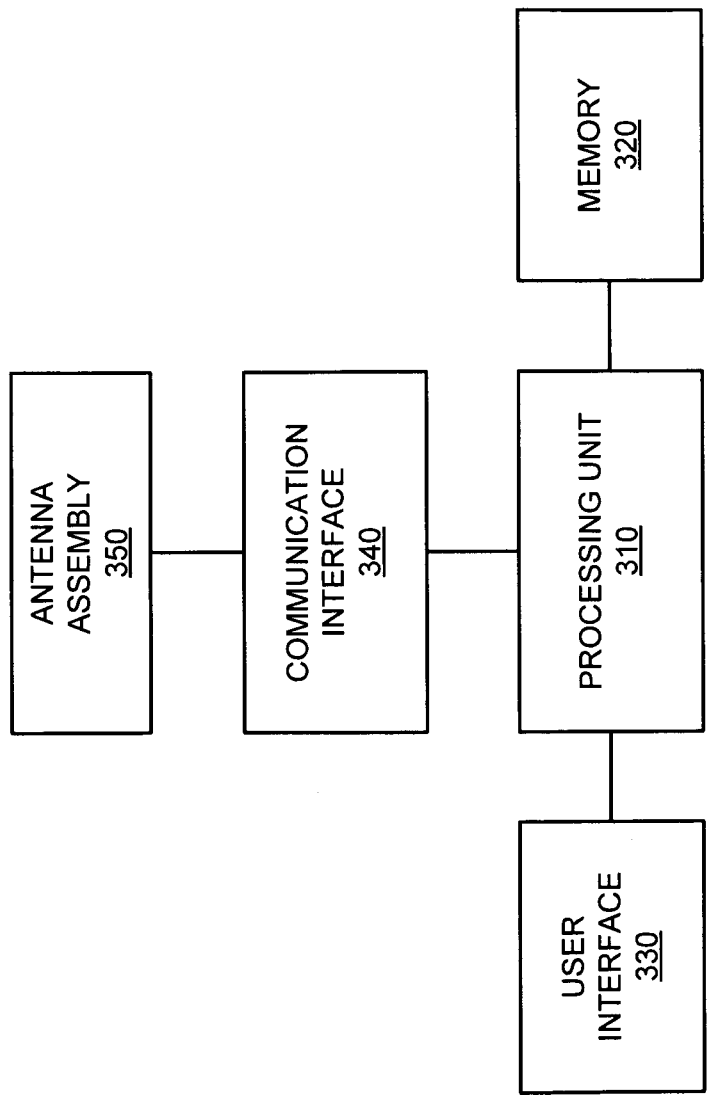
FIG. 3 depicts a diagram of exemplary components of user equipment illustrated in FIGS. 1 and 2.

FIG. 3 depicts a diagram of exemplary components of a device 300 that may correspond to user equipment 110. As illustrated, device 300 may include a processing unit 310, memory 320, a user interface 330, a communication interface 340, and/or an antenna assembly 350.

Processing unit 310 may include one or more microprocessors, application-specific integrated circuits (ASICs), field-programmable gate arrays (FPGAs), or the like. Processing unit 310 may control operation of device 300 and its components. In one implementation, processing unit 310 may control operation of components of device 300 in a manner described herein.

Memory 320 may include a random access memory (RAM), a read-only memory (ROM), and/or another type of memory to store data and instructions that may be used by processing unit 310.

User interface 330 may include mechanisms for inputting information to device 100 and/or for outputting information from device 100. Examples of input and output mechanisms might include buttons (e.g., control buttons, keys of a keypad, a joystick, etc.) or a touch screen interface to permit data and control commands to be input into device 300; a speaker to receive electrical signals and output audio signals; a microphone to receive audio signals and output electrical signals; a display to output visual information (e.g., text input into device 300); a vibrator to cause device 300 to vibrate; etc.

Communication interface 340 may include, for example, a transmitter that may convert baseband signals from processing unit 310 to radio frequency (RF) signals and/or a receiver that may convert RF signals to baseband signals. Alternatively, communication interface 340 may include a transceiver to perform functions of both a transmitter and a receiver. Communication interface 340 may connect to antenna assembly 350 for transmission and/or reception of the RF signals.

Antenna assembly 350 may include one or more antennas to transmit and/or receive RF signals over the air. Antenna assembly 350 may, for example, receive RF signals from communication interface 340 and transmit them over the air, and receive RF signals over the air and provide them to communication interface 340. In one implementation, for example, communication interface 340 may communicate with a network (e.g., network 100) and/or devices connected to a network.

As will be described in detail below, device 300 may perform certain operations described herein in response to processing unit 310 executing software instructions of an application contained in a computer-readable medium, such as memory 320. A computer-readable medium may be defined as a physical or logical memory device. A logical memory device may include memory space within a single physical memory device or spread across multiple physical memory devices. The software instructions may be read into memory 320 from another computer-readable medium or from another device via communication interface 340. The software instructions contained in memory 320 may cause processing unit 310 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may contain fewer, different, differently arranged, or additional components than depicted in FIG. 3. In still other implementations, one or more components of device 300 may perform one or more other tasks described as being performed by one or more other components of device 300.

Figure 4:
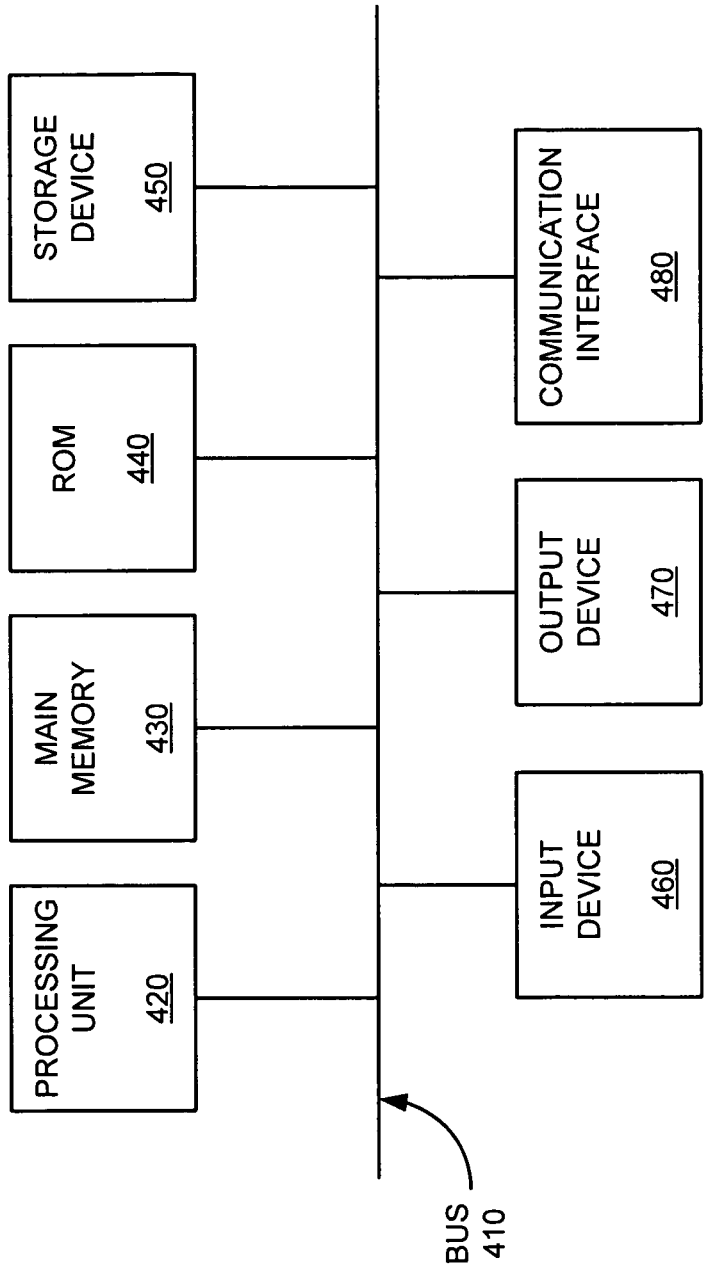
FIG. 4 illustrates a diagram of exemplary components of a base station and/or a mobility management entity/serving gateway (MME/S-GW) depicted in FIG. 2.

FIG. 4 illustrates a diagram of exemplary components of a device 400 that may correspond to base station 200 and/or MME/S-GW 210. As illustrated, device 400 may include a bus 410, a processing unit 420, a main memory 430, a ROM 440, a storage device 450, an input device 460, an output device 470, and/or a communication interface 480. Bus 410 may include a path that permits communication among the components of device 400.

Processing unit 420 may include one or more processors, microprocessors, or other types of processors that may interpret and execute instructions. Main memory 430 may include a RAM or another type of dynamic storage device that may store information and instructions for execution by processing unit 420. ROM 440 may include a ROM device or another type of static storage device that may store static information and/or instructions for use by processing unit 420. Storage device 450 may include a magnetic and/or optical recording medium and its corresponding drive.

Input device 460 may include a mechanism that permits an operator to input information to device 400, such as a keyboard, a mouse, a pen, a microphone, voice recognition and/or biometric mechanisms, a touch screen, etc. Output device 470 may include a mechanism that outputs information to the operator, including a display, a printer, a speaker, etc. Communication interface 480 may include any transceiver-like mechanism that enables device 400 to communicate with other devices and/or systems. For example, communication interface 480 may include mechanisms for communicating with another device or system via a network, such as network 100.

In one implementation, if device 400 corresponds to base station 200, input device 460, output device 470, and/or communication interface 480 may be replaced with antennas, transceivers (TX/RX), and an Tub interface (I/F). The antennas may include one or more directional and/or omnidirectional antennas. The transceivers may be associated with the antennas and may include transceiver circuitry for transmitting and/or receiving symbol sequences in a network, such as network 100, via the antennas. The Tub interface may include one or more line cards that may allow device 400 to transmit data to and receive data from another device (e.g., MME/S-GW 210).

As described herein, device 400 may perform certain operations in response to processing unit 420 executing software instructions contained in a computer-readable medium, such as main memory 430. The software instructions may be read into main memory 430 from another computer-readable medium, such as storage device 450, or from another device via communication interface 480. The software instructions contained in main memory 430 may cause processing unit 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows exemplary components of device 400, in other implementations, device 400 may contain fewer, different, differently arranged, or additional components than depicted in FIG. 4. In still other implementations, one or more components of device 400 may perform one or more other tasks described as being performed by one or more other components of device 400.

Figure 5:
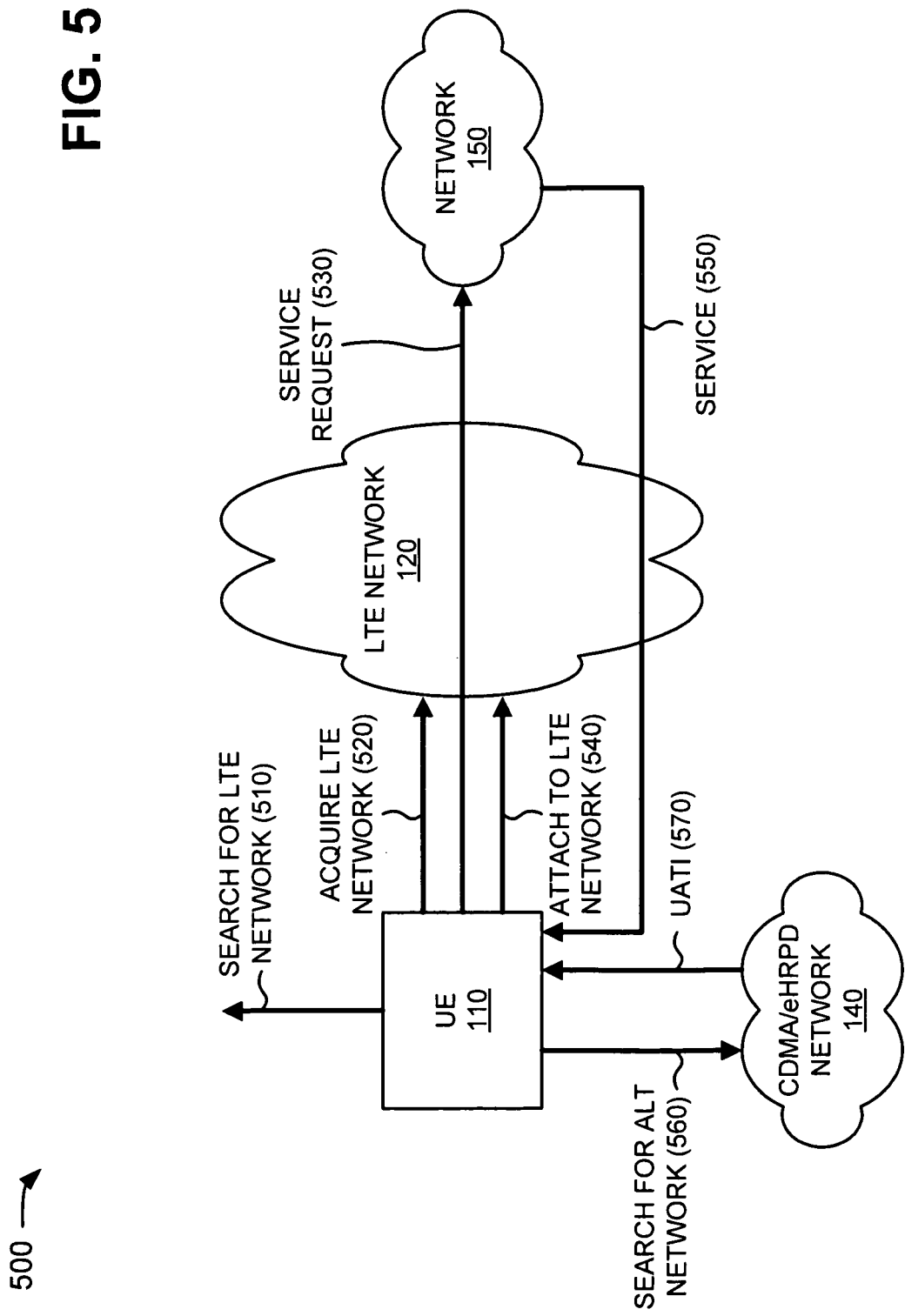
FIG. 5 depicts a diagram of exemplary interactions among components of an exemplary portion of the network illustrated in FIG. 1.

FIG. 5 depicts a diagram of exemplary interactions among components of an exemplary portion 500 of network 100. As illustrated, exemplary network portion 500 may include user equipment 110, LTE network 120, CDMA/eHRPD network 140, and network 150. User equipment 110, LTE network 120, CDMA/eHRPD network 140, and network 150 may include the features described above in connection with, for example, FIG. 1.

As further shown in FIG. 5, user equipment 110 may power up and may reference a HOL for access systems. For example, user equipment 110 may reference the HOL for a preferred or primary access system (e.g., LTE network 120) and an alternate access system (e.g., a PLMN for CDMA/ eHRPD network 140). The HOL may direct user equipment 110 to search for LTE network 120, and user equipment 110 may search for LTE network 120, as indicated by reference number 510. User equipment 110 may reference the PLMN to detect and acquire LTE network 120, as indicated by reference number 520. In one implementation, user equipment 110 may be a multi-mode device that is capable of utilizing MIMO for acquiring LTE network 120.

After acquisition of LTE network 120, user equipment 110 may initiate a service request 530 for a service (e.g., Internet services, IMS services, voice services, etc.) provided by network 150. User equipment 110 may attach to LTE network 120, as indicated by reference number 540, and LTE network 120 may provide service request 530 to network 150. In response to service request 530, network 150 may provide a requested service 550 to user equipment 110 via LTE network 120.

If user equipment 110 does not initiate service request 530 after a specified period of time, user equipment 110 may remain in LTE network 120. If user equipment 110 does not interact with service 550, user equipment 110 may go dormant or idle on LTE network 120. When user equipment 110 is dormant on LTE network 120, user equipment 110 may detune one radio and may reference the preferred roaming list (PRL) to begin a search for an alternate access system (e.g., CDMA/eHRPD network 140), as indicated by reference number 560. User equipment 110 may request and receive a Unicast Access Terminal Identifier (UATI) 570 from CDMA/ eHRPD network 140. After UATI 570 is assigned, user equipment 110 may immediately return to LTE network 120.

The RF operational environment for LTE network 120 may support a sufficient signal level to utilize MIMO. Specifically, the RF operational environment may need to maintain a carrier-to-interference (C/I) ratio above a certain operational threshold for user equipment 110 to maintain MIMO functionality in LTE network 120. If the C/I ratio falls below this operational threshold for a specified time, MIMO may no longer function. Thus LTE network 120 may not function and user equipment 110 may demote service to an alternate access system (e.g., CDMA/eHRPD network 140). User equipment 110 may stay in a CDMA/eHRPD service mode for a specified time and may rescan for LTE network 120 and the required C/I ratio before attempting to reacquire LTE network 120. If user equipment 110 detects a sufficient C/I ratio for LTE MIMO operation, user equipment 110 may reacquire LTE network 120 and may move to a LTE service mode.

While user equipment 110 is attached to LTE network 120, user equipment 110 may not detune and request UATI 570 from CDMA/eHRPD network 140. User equipment 110 may request UATI 570 if the RF operational environment is incapable of supporting MIMO and/or if user equipment 110 goes dormant for a specified time on LTE network 120.

Although FIG. 5 shows exemplary components of network portion 500, in other implementations, network portion 500 may contain fewer, different, differently arranged, or additional components than depicted in FIG. 5. In still other implementations, one or more components of network portion 500 may perform one or more other tasks described as being performed by one or more other components of network portion 500.

FIG. 6 illustrates a diagram of exemplary interactions among components of another exemplary portion 600 of network 100. As shown, exemplary network portion 600 may include user equipment 110, LTE network 120, CDMA/ eHRPD network 140, and network 150. User equipment 110, LTE network 120, CDMA/eHRPD network 140, and network 150 may include the features described above in connection with, for example, FIG. 1.

As further shown in FIG. 6, if user equipment 110 is attached to LTE network 120 and disconnects 610 a data session with network 150 (e.g., user equipment 110 stops receiving service 550 (FIG. 5) provided by network 150), user equipment 110 may request LTE network 120 to deregister 620 user equipment 110 from LTE network 120. If user equipment 110 is maintaining UATI 570 (FIG. 5), user equipment 110 may also request CDMA/eHRPD network 140 to deregister 630 user equipment 110 from CDMA/eHRPD network 140. User equipment 110 may return to the HOL for directions and may perform the functions described above in connection with FIG. 5.

Although FIG. 6 shows exemplary components of network portion 600, in other implementations, network portion 600 may contain fewer, different, differently arranged, or additional components than depicted in FIG. 6. In still other implementations, one or more components of network portion 600 may perform one or more other tasks described as being performed by one or more other components of network portion 600.

FIG. 7 depicts a diagram of exemplary interactions among components of still another exemplary portion 700 of network 100. As shown, exemplary network portion 700 may include user equipment 110 and LTE network 120. User equipment 110 and LTE network 120 may include the features described above in connection with, for example, FIG. 1.

As further shown in FIG. 7, user equipment 110 may power up and may reference a HOL 710 for access systems. HOL 710 may include two lists. A first list may contain a preferred roaming list for 1XRTT and HRPD, and a second list may include a PLMN for GSM, UMTS, and LTE. HOL 710 may permit user equipment 110 to switch back and forth between the two lists. In one example, user equipment 110 may reference HOL 710 for a preferred or primary access system (e.g., LTE network 120) and an alternate access system (e.g., CDMA/eHRPD network 140). HOL 710 may direct user equipment 110 to search for LTE network 120 and user equipment 110 may search for LTE network 120, as indicated by reference number 720.

User equipment 110 may reference the PLMN to detect and acquire LTE network 120. In one implementation, user equipment 110 may be a multi-mode device that is capable of utilizing MIMO for acquiring LTE network 120. For successful acquisition and attachment to LTE network 120, the operational RF environment may need to be sufficient for LTE operation. The RF operational environment may be determined by a specified minimum carrier-to-interference (C/I) ratio threshold (e.g., THRESH1). As shown in FIG. 7, user equipment 110 may receive a C/I ratio 730 from LTE network 120 and may compare C/I ratio 730 to the minimum C/I ratio threshold. If C/I ratio 730 is sufficient for LTE service (e.g., greater than the minimum C/I ratio threshold), user equipment 110 may acquire and attach to LTE network 120, as indicated by reference number 740. If C/I ratio 730 is below the minimum C/I ratio threshold, user equipment 110 may reference HOL 710 in order to acquire an alternate access network (e.g., CDMA/eHRPD network 140), as indicated by reference number 750.

If user equipment 110 acquires and attaches to LTE network 120, as indicated by reference number 740, user equipment 110 may enter into either an active operational mode or an idle operational mode. User equipment 110 may remain attached to LTE network 120 in the active operational mode until C/I ratio 730 falls below the specified C/I ratio threshold (e.g., THRESH2) for a configurable time period, as indicated by reference number 760. If C/I ratio 730 falls below the specified C/I ratio threshold (e.g., THRESH2) but C/I ratio 730 is sufficient to maintain minimal LTE link margin, user equipment 110 may tune away one receiver to acquire an alternate access network (e.g., CDMA/eHRPD network 140), as indicated by reference number 780. If C/I ratio 730 deteriorates such that the minimal LTE link margin cannot be maintained (e.g., C/I ratio<THRESH1), user equipment 110 may attach to the alternate access network (e.g., CDMA/eHRPD network 140).

If user equipment 110 is in an idle operational mode 790 for a specified time period, user equipment 110 may temporarily tune away from LTE network 120 to acquire an alternate access network, and may return to LTE network 120. In this case, the tune away may be triggered by an idle mode timer rather than C/I ratio threshold. Upon returning to LTE network 120 (e.g., after alternate access network acquisition), user equipment 110 may check C/I ratio 730 and may decide to remain in idle operational mode 790 on LTE network 120 or to move to the acquired alternate access network.

Although FIG. 7 shows exemplary components of network portion 700, in other implementations, network portion 700 may contain fewer, different, differently arranged, or additional components than depicted in FIG. 7. In still other implementations, one or more components of network portion 700 may perform one or more other tasks described as being performed by one or more other components of network portion 700.

FIG. 8 illustrates a diagram of exemplary interactions among components of a further exemplary portion 800 of network 100. As illustrated, exemplary network portion 800 may include user equipment 110, LTE network 120, CDMA/eHRPD network 140, and network 150. User equipment 110, LTE network 120, CDMA/eHRPD network 140, and network 150 may include the features described above in connection with, for example, FIG. 1.

As further shown in FIG. 8, user equipment 110 may power up and may reference a HOL for access systems. For example, user equipment 110 may reference the HOL for a preferred or primary access system (e.g., LTE network 120) and an alternate access system (e.g., a PLMN for CDMA/eHRPD network 140). The HOL may direct user equipment 110 to search for LTE network 120 and user equipment 110 may search for LTE network 120, as indicated by reference number 810. User equipment 110 may reference the PLMN to detect and acquire LTE network 120, as indicated by reference number 820. In one implementation, user equipment 110 may be a multi-mode device that is capable of utilizing MIMO for acquiring LTE network 120.

After acquisition of LTE network 120, user equipment 110 may generate a service request 830 for a service (e.g., Internet services, IMS services, voice services, etc.) provided by network 150. User equipment 110 may attach to LTE network 120, as indicated by reference number 840, and LTE network 120 may provide service request 830 to network 150. In response to service request 530, network 150 may provide a requested service 850 to user equipment 110 via LTE network 120.

If user equipment 110 does not initiate service request 830 after a specified period of time, user equipment 110 may remain in LTE network 120. If user equipment 110 does not interact with service 850, user equipment 110 may go dormant or idle on LTE network 120. When user equipment 110 is dormant on LTE network 120, user equipment 110 may detune one radio and may reference the preferred roaming list (PRL) to begin a search for an alternate access system (e.g., CDMA/eHRPD network 140), as indicated by reference number 860. User equipment 110 may request and receive a UATI 870 from CDMA/eHRPD network 140. After UATI 570 is assigned, user equipment 110 may return to LTE network 120.

The RF operational environment for LTE network 120 may support a sufficient signal level to utilize MIMO. Specifically, the RF operational environment may need to maintain a C/I ratio above a first operational threshold for user equipment 110 to maintain MIMO functionality in LTE network 120, and above a second operational threshold for user equipment 110 to continue to receive service 850.

As shown in FIG. 8, user equipment 110 may receive a C/I ratio 880 from LTE network 120. If C/I ratio 880 remains equal to or above the second operational threshold, user equipment 110 may remain attached to LTE network 120 and may continue to receive service 850. If C/I ratio 880 is below the second operational threshold, user equipment 110 may cease receiving service 850 and may determine if C/I ratio 880 is above the first operational threshold. If C/I ratio 880 remains equal to or above the first operational threshold, user equipment 110 may search for an alternate access network (e.g., CDMA/eHRPD network 140) 860, may acquire UATI 870 from CDMA/eHRPD 140, and may return to LTE network 120. If C/I ratio 880 is below the first operational threshold for a specified time, MIMO may no longer function. Thus LTE network 120 may not function and user equipment 110 may attach to an alternate access system (e.g., CDMA/eHRPD network 140), as indicated by reference number 890. User equipment 110 may remain attached to CDMA/eHRPD network 140 for a specified time and may search for LTE network 120 and C/I ratio 880 before attempting to reacquire LTE network 120. If user equipment 110 detects a sufficient C/I ratio 880 for LTE MIMO operation, user equipment 110 may reacquire LTE network 120 and may reattach to LTE network 120.

User equipment 110 may deregister from LTE network 120 and CDMA/eHRPD network 140 as described above in connection with, for example, FIG. 6.

Although FIG. 8 shows exemplary components of network portion 800, in other implementations, network portion 800 may contain fewer, different, differently arranged, or additional components than depicted in FIG. 8. In still other implementations, one or more components of network portion 800 may perform one or more other tasks described as being performed by one or more other components of network portion 800.

Figure 9A:
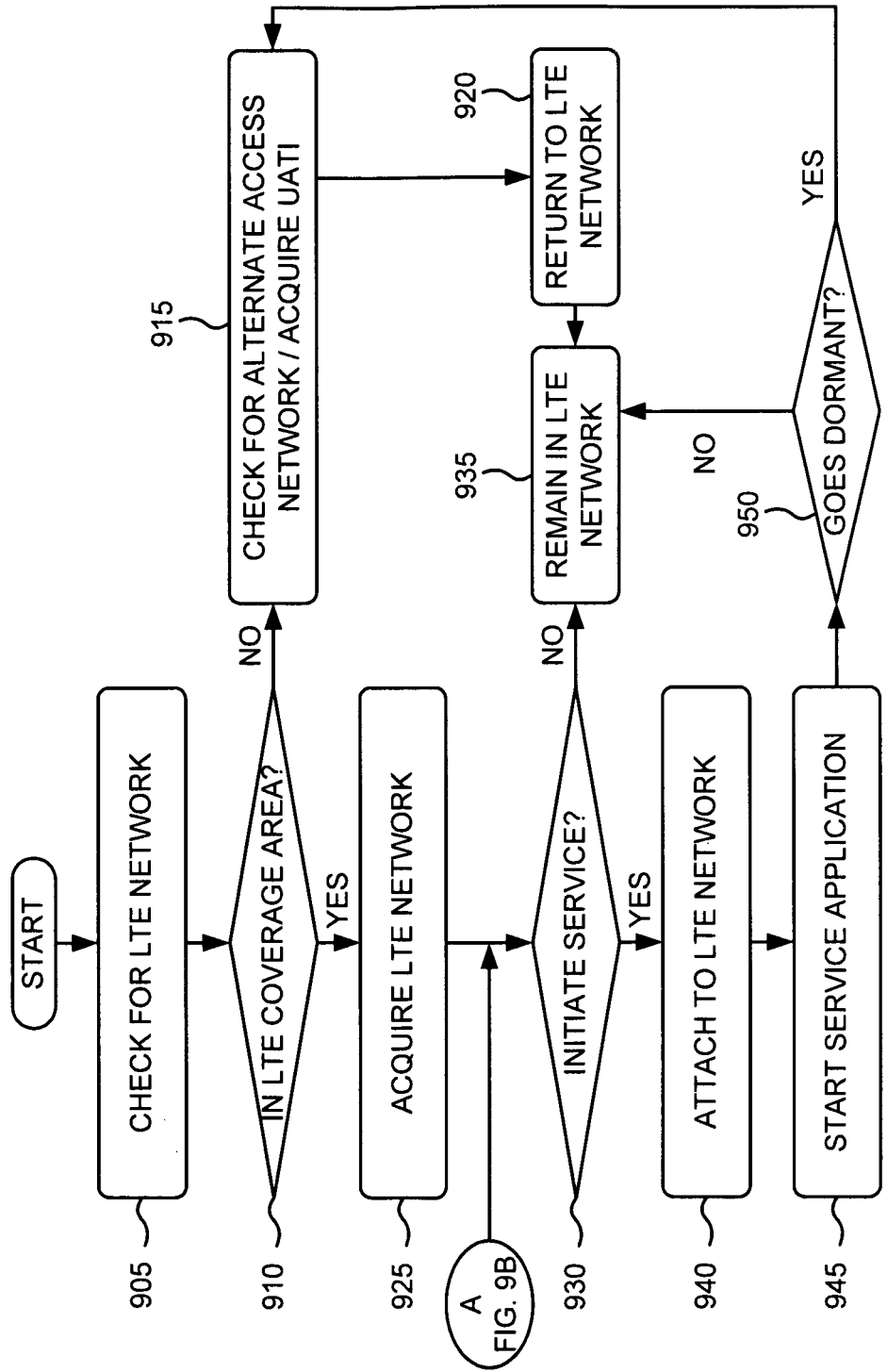
FIGS. 9A and 9B depict flow charts of an exemplary process for detecting, selecting, acquiring, and maintaining attachment with a LTE network according to implementations described herein.
Figure 9B:
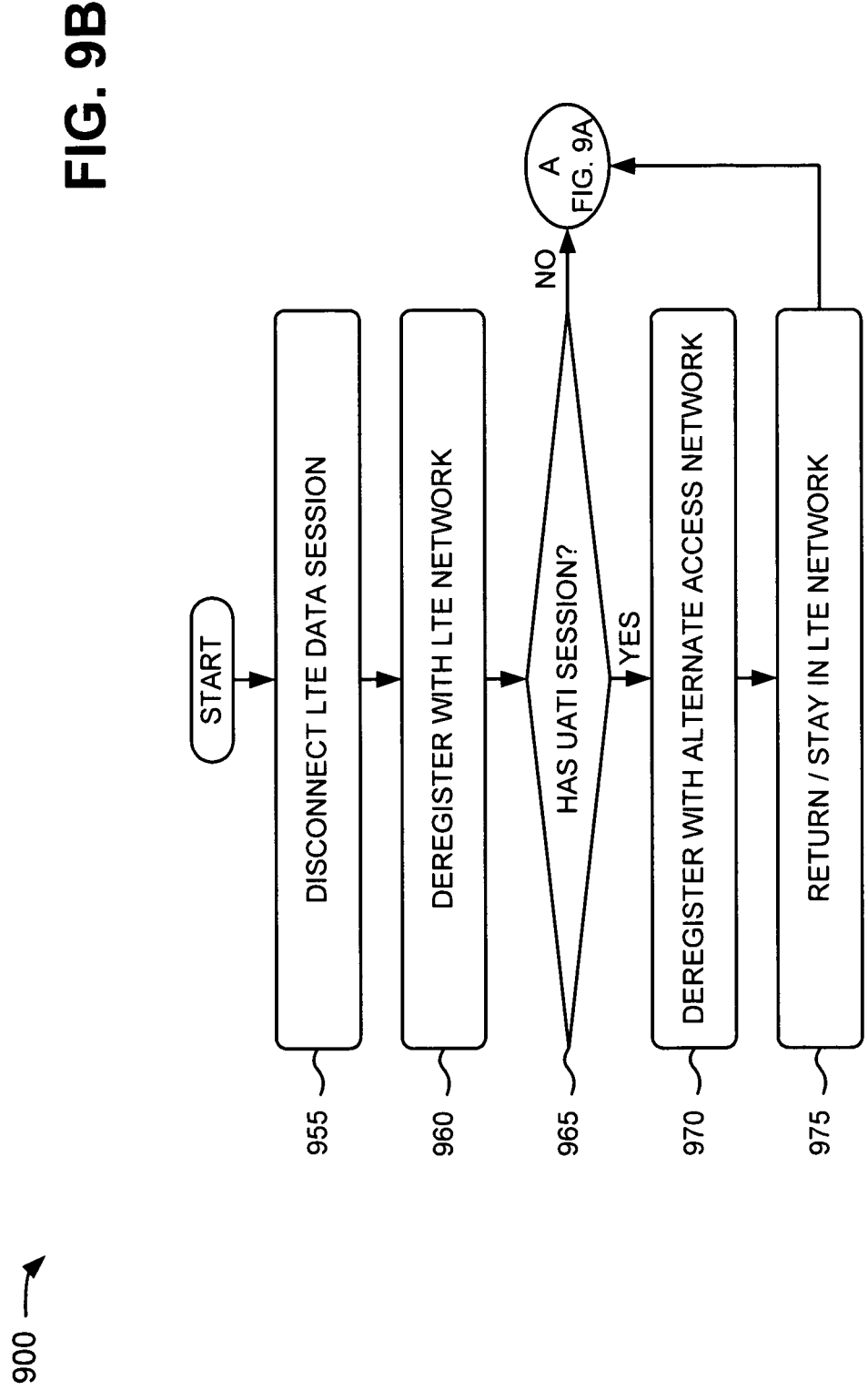

FIGS. 9A and 9B depict flow charts of an exemplary process 900 for detecting, selecting, acquiring, and maintaining attachment with a LTE network according to implementations described herein. In one implementation, process 900 may be performed by user equipment 110. In other implementations, some or all of process 900 may be performed by another device or group of devices (e.g., communicating with user equipment 110), such as one or more components of LTE network 120.

As illustrated in FIG. 9A, process 900 may begin with user equipment checking for an LTE network (block 905), and determining whether the user equipment is in a coverage area provided by the LTE network (block 910). For example, in implementations described above in connection with FIG. 5, user equipment 110 may power up and may reference a HOL for access systems. In one example, user equipment 110 may reference the HOL for a preferred or primary access system (e.g., LTE network 120) and an alternate access system (e.g., a PLMN for CDMA/eHRPD network 140). The HOL may direct user equipment 110 to search for LTE network 120 and user equipment 110 may search for LTE network 120, as indicated by reference number 510. User equipment 110 may determine if it in a coverage area provide by LTE network 120.

As further shown in FIG. 9A, if the user equipment is not in the LTE coverage area (block 910—NO), the user equipment may check for an alternate access network and/or may acquire a UATI (block 915) and may return to the LTE network (block 920). Otherwise (block 910—YES), the user equipment may acquire the LTE network (block 925). For example, in implementations described above in connection with FIG. 5, if user equipment 110 is within the coverage area associated with LTE network 120, user equipment 110 may reference the PLMN to detect and acquire LTE network 120, as indicated by reference number 520. In one example, user equipment 110 may be a multi-mode device that is capable of utilizing MIMO for acquiring LTE network 120. If user equipment 110 is not within the coverage area associated with LTE network 120, user equipment 110 may detune one radio and may reference the preferred roaming list (PRL) to begin a search for an alternate access system (e.g., CDMA/eHRPD network 140), as indicated by reference number 560. User equipment 110 may request and receive UATI 570 from CDMA/eHRPD network 140.

Returning to FIG. 9A, the user equipment may determine whether to initiate a service (block 930). If the user equipment initiates the service (block 930—YES), the user equipment may attach to the LTE network (block 940) and may start a service application (block 945). For example, in implementations described above in connection with FIG. 5, after acquisition of LTE network 120, user equipment 110 may initiate service request 530 for a service (e.g., Internet services, IMS services, voice services, etc.) provided by network 150. User equipment 110 may attach to LTE network 120, as indicated by reference number 540, and LTE network 120 may provide service request 530 to network 150. In response to service request 530, network 150 may provide the requested service 550 to user equipment 110 via LTE network 120.

As further shown in FIG. 9A, it may be determine whether the user equipment is dormant or idle (block 950). If the user equipment does not initiate the service (block 930—NO) or if the user equipment is not dormant (block 950—NO), the user equipment may remain in the LTE network (block 935). If the user equipment is dormant (block 950—YES), the user equipment may check for an alternate access network and/or may acquire a UATI (block 915). For example, in implementations described above in connection with FIG. 5, if user equipment 110 does not initiate service request 530 after a specified period of time, user equipment 110 may remain in LTE network 120. If user equipment 110 does not interact with service 550, user equipment 110 may go dormant or idle on LTE network 120. When user equipment 110 is dormant on LTE network 120, user equipment 110 may detune one radio and may reference the preferred roaming list (PRL) to begin a search for an alternate access system (e.g., CDMA/eHRPD network 140), as indicated by reference number 560. User equipment 110 may request and receive UATI 570 from CDMA/eHRPD network 140. After UATI 570 is assigned, user equipment 110 may return to LTE network 120.

As shown in FIG. 9B, the user equipment may disconnect from a LTE data session (block 955), may deregister with the LTE network (block 960), and may determine if there is a UATI session (block 965). For example, in implementations described above in connection with FIGS. 5 and 6, if user equipment 110 is attached to LTE network 120 and disconnects 610 a data session with network 150 (e.g., user equipment 110 stops receiving service 550 provided by network 150), user equipment 110 may request LTE network 120 to deregister 620 user equipment 110 from LTE network 120. User equipment 110 may determine if it is maintaining a UATI (e.g., UATI 570).

As further shown in FIG. 9B, if there is no UATI session (block 965—NO), the user equipment may return to block 930 (FIG. 9A). Otherwise (block 965—YES), the user equipment may deregister with the alternate access network (block 970) and may return to or stay in the LTE network (block 975). For example, in implementations described above in connection with FIGS. 5 and 6, if user equipment 110 is not maintaining UATI 570, user equipment 110 may return to LTE network 1120 may initiate another service request 530. If user equipment 110 is maintaining UATI 570, user equipment 110 may request CDMA/eHRPD network 140 to deregister 630 user equipment 110 from CDMA/eHRPD network 140. User equipment 110 may return to the HOL for directions and may return to or stay in the LTE network 120.

Figure 10A:
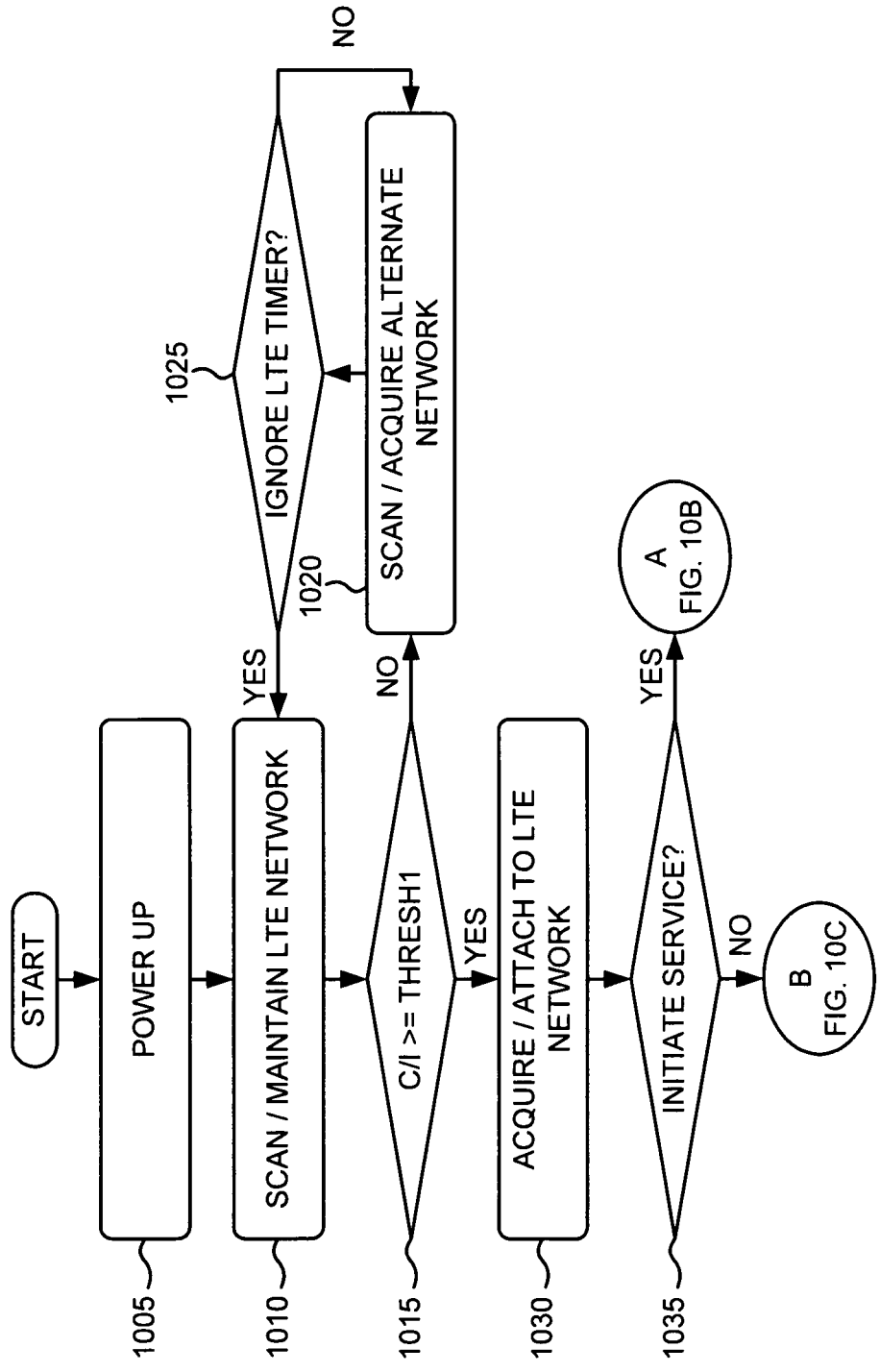
FIGS. 10A-10C illustrate flow charts of another exemplary process for detecting, selecting, acquiring, and maintaining attachment with a LTE network according to implementations described herein.
Figure 10B:
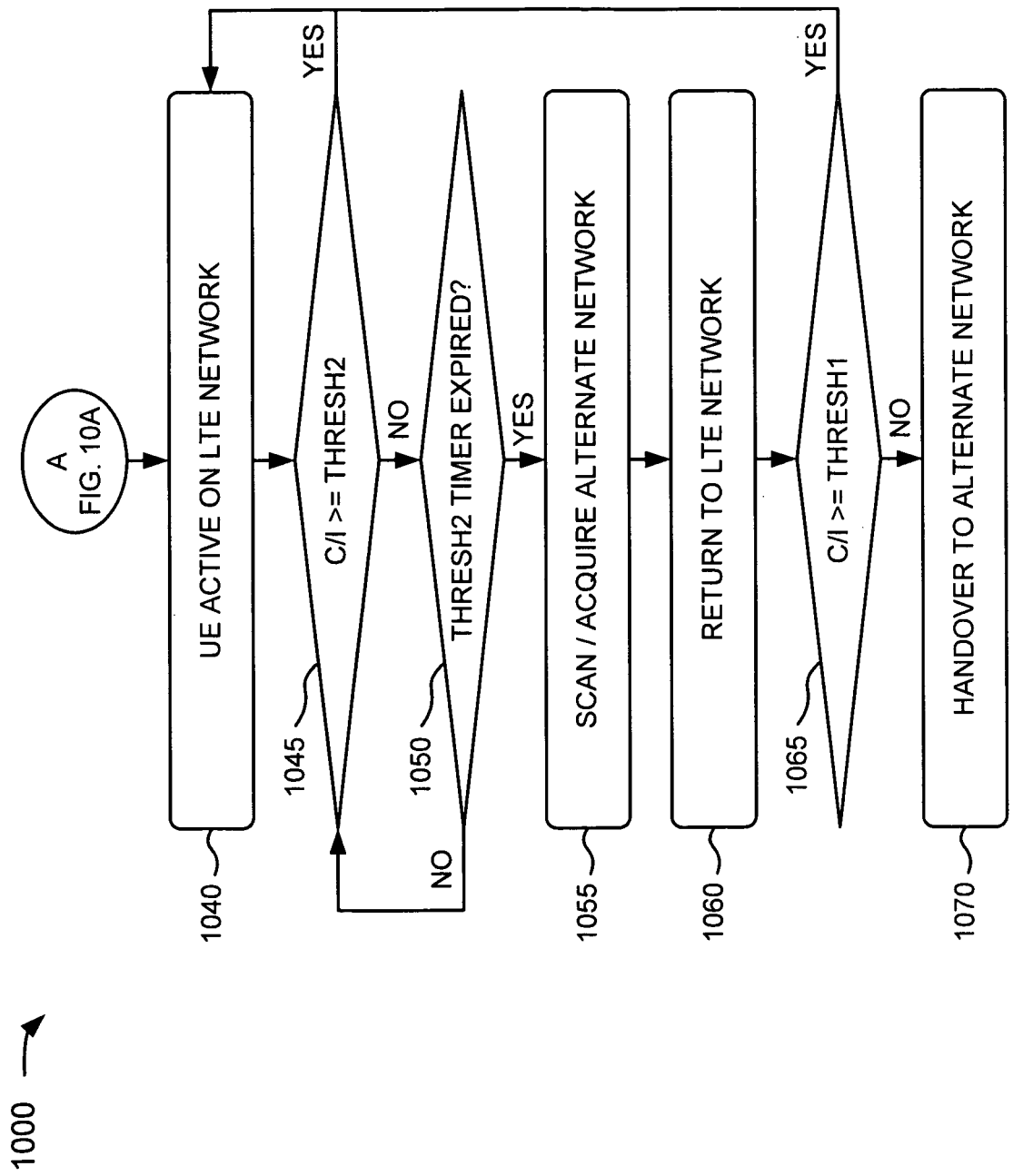
Figure 10C:
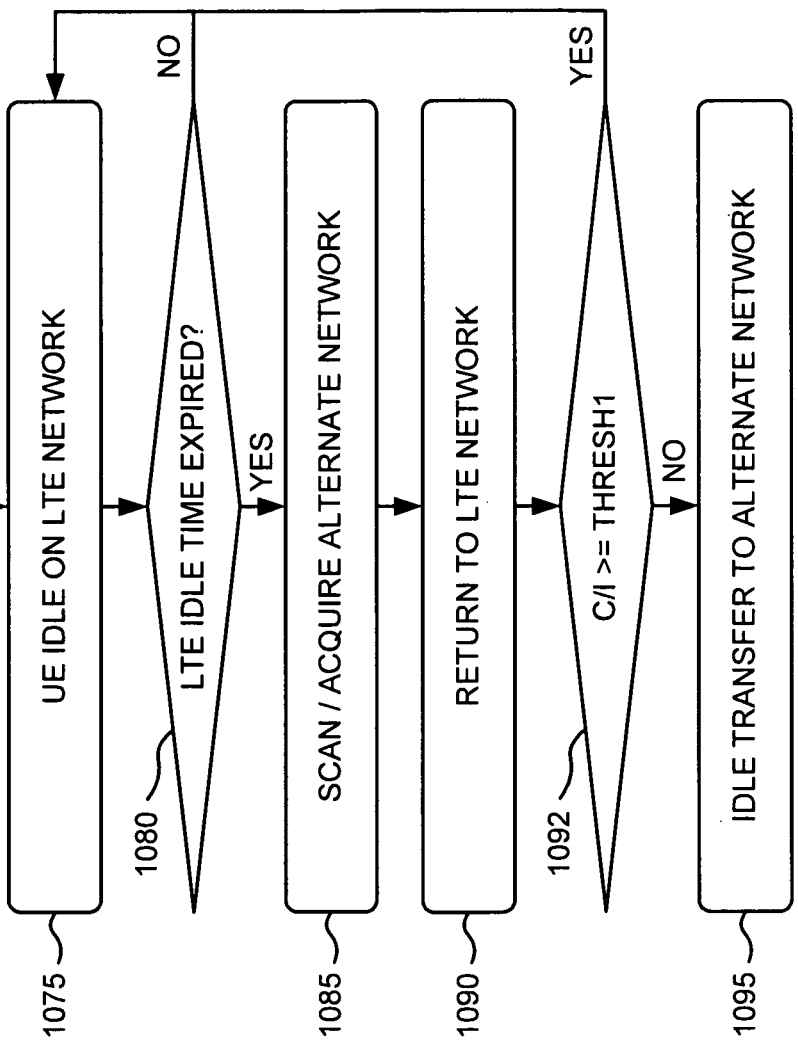

FIGS. 10A-10C illustrate flow charts of another exemplary process 1000 for detecting, selecting, acquiring, and maintaining attachment with a LTE network according to implementations described herein. In one implementation, process 1000 may be performed by user equipment 110. In other implementations, some or all of process 1000 may be performed by another device or group of devices (e.g., communicating with user equipment 110), such as one or more components of LTE network 120.

As illustrated in FIG. 10A, process 1000 may begin with user equipment powering up (block 1005), and the user equipment searching for or maintaining association with a LTE network (block 1010). For example, in implementations described above in connection with FIG. 7, user equipment 110 may power up and may reference HOL 710 for access systems. HOL 710 may include two lists. A first list may contain a preferred roaming list for 1XRTT and HRPD, and a second list may include a PLMN for GSM, UMTS, and LTE. HOL 710 may permit user equipment 110 to switch back and forth between the two lists. In one example, user equipment 110 may reference HOL 710 for a preferred or primary access system (e.g., LTE network 120) and an alternate access system (e.g., CDMA/eHRPD network 140). HOL 710 may direct user equipment 110 to search for LTE network 120 and user equipment 110 may search for LTE network 120, as indicated by reference number 720.

As further shown in FIG. 10A, if the user equipment determines that a C/I ratio associated with the LTE network is less than a first threshold (block 1015—NO), the user equipment may search for and acquire an alternate access network (block 1020) and may determine whether to ignore a timer associated with the LTE network (block 1025). If the LTE is ignored (block 1025—YES), the user equipment may search for or maintain association with the LTE network (block 1010). Otherwise (block 1025—NO), the user equipment may search for and acquire an alternate access network (block 1020).

For example, in implementations described above in connection with FIG. 7, the RF operational environment of LTE network 120 may be determined by a specified minimum C/I ratio threshold (e.g., THRESH1). User equipment 110 may receive C/I ratio 730 from LTE network 120 and may compare C/I ratio 730 to the minimum C/I ratio threshold. If C/I ratio 730 is below the minimum C/I ratio threshold, user equipment 110 may reference HOL 710 in order to acquire an alternate access network (e.g., CDMA/eHRPD network 140), as indicated by reference number 750. After acquiring the alternate access network, user equipment 110 may, in one example, wait a specified period of time before attempting to search for LTE network 120. In another example, user equipment 110 may not wait for the specified time period and may immediately attempt to search for LTE network 120.

Returning to FIG. 10A, if the user equipment determines that the C/I ratio associated with the LTE network is greater than or equal to the first threshold (block 1015—YES), the user equipment may acquire and attach to the LTE network (block 1030), and may determine whether to initiate a service request (block 1035). If the user equipment initiates the service request (block 1035—YES), process 1000 may perform the blocks provided in FIG. 10B. If the user equipment does not initiate the service request (block 1035—NO), process 100 may perform the blocks provided in FIG. 10C. For example, in implementations described above in connection with FIG. 7, if C/I ratio 730 is sufficient for LTE service (e.g., greater than the minimum C/I ratio threshold), user equipment 110 may acquire and attach to LTE network 120, as indicated by reference number 740. If user equipment 110 acquires and attaches to LTE network 120, as indicated by reference number 740, user equipment 110 may enter into either an active operational mode or an idle operational mode.

As shown in FIG. 10B, the user equipment may be in an active operational mode on the LTE network (block 1040) and may determine if the C/I ratio is greater than or equal to a second threshold (block 1045). If the C/I ratio is greater than or equal to the second threshold (block 1045—YES), the user equipment may remain in the active operational mode (block 1040). If the C/I ratio is less than the second threshold (block 1045—NO), the user equipment may determine whether a second threshold timer has expired (block 1050). If the second threshold timer has not expired (block 1050—NO), the user equipment may determine if the C/I ratio is greater than or equal to a second threshold (block 1045). For example, in implementations described above in connection with FIG. 7, if user equipment 110 acquires and attaches to LTE network 120, user equipment 110 may enter into either an active operational mode. User equipment 110 may remain attached to LTE network 120 in the active operational mode until C/I ratio 730 falls below the specified C/I ratio threshold (e.g., THRESH2) for a configurable time period, as indicated by reference number 760.

As further shown in FIG. 10B, if the second threshold timer has expired (block 1050—YES), the user equipment may search for and acquire the alternate access network (block 1055), may return to the LTE network (block 1060), and may determine whether the C/I ratio is greater than or equal to the first threshold (block 1065). If the C/I ratio is less than the first threshold (block 1065—NO), the user equipment may handover to the alternate access network (block 1070). Otherwise (block 1065—YES), the user equipment may remain in the active operational mode (block 1040). For example, in implementations described above in connection with FIG. 7, if C/I ratio 730 falls below the specified C/I ratio threshold (e.g., THRESH2) but C/I ratio 730 is sufficient to maintain minimal LTE link margin, user equipment 110 may tune away one receiver to acquire an alternate access network (e.g., CDMA/eHRPD network 140), as indicated by reference number 780. If C/I ratio 730 deteriorates such that the minimal LTE link margin cannot be maintained (e.g., C/I ratio<THRESH1), user equipment 110 may attach to the alternate access network (e.g., CDMA/eHRPD network 140).

As shown in FIG. 10C, the user equipment may be in an idle operational mode on the LTE network (block 1075) and may determine if a LTE idle time has expired (block 1080). If the LTE idle time has not expired (block 1080—NO), the user equipment may remain in the idle operational mode (block 1075). For example, in implementations described above in connection with FIG. 7, if user equipment 110 is in idle operational mode 790 for less than a specified time period, user equipment 110 may remain in idle operation mode 790.

As further shown in FIG. 10C, if the LTE idle time has expired (block 1080—YES), the user equipment may search for and acquire the alternate access network (block 1085), may return to the LTE network (block 1090), and may determine whether the C/I ratio is greater than or equal to the first threshold (block 1092). If the C/I ratio is less than the first threshold (block 1092—NO), the user equipment may transfer its idle operational mode to the alternate access network (block 1095). Otherwise (block 1092—YES), the user equipment may remain in the idle operational mode (block 1075). For example, in implementations described above in connection with FIG. 7, if user equipment 110 is in idle operational mode 790 for a specified time period, user equipment 110 may temporarily tune away from LTE network 120 to acquire an alternate access network, and may return to LTE network 120. In this case, the tune away may be triggered by an idle mode timer rather than C/I ratio threshold. Upon returning to LTE network 120 (e.g., after alternate access network acquisition), user equipment 110 may check C/I ratio 730 and may decide to remain in idle operational mode 790 on LTE network 120 or to move to the acquired alternate access network.

Figure 11B:
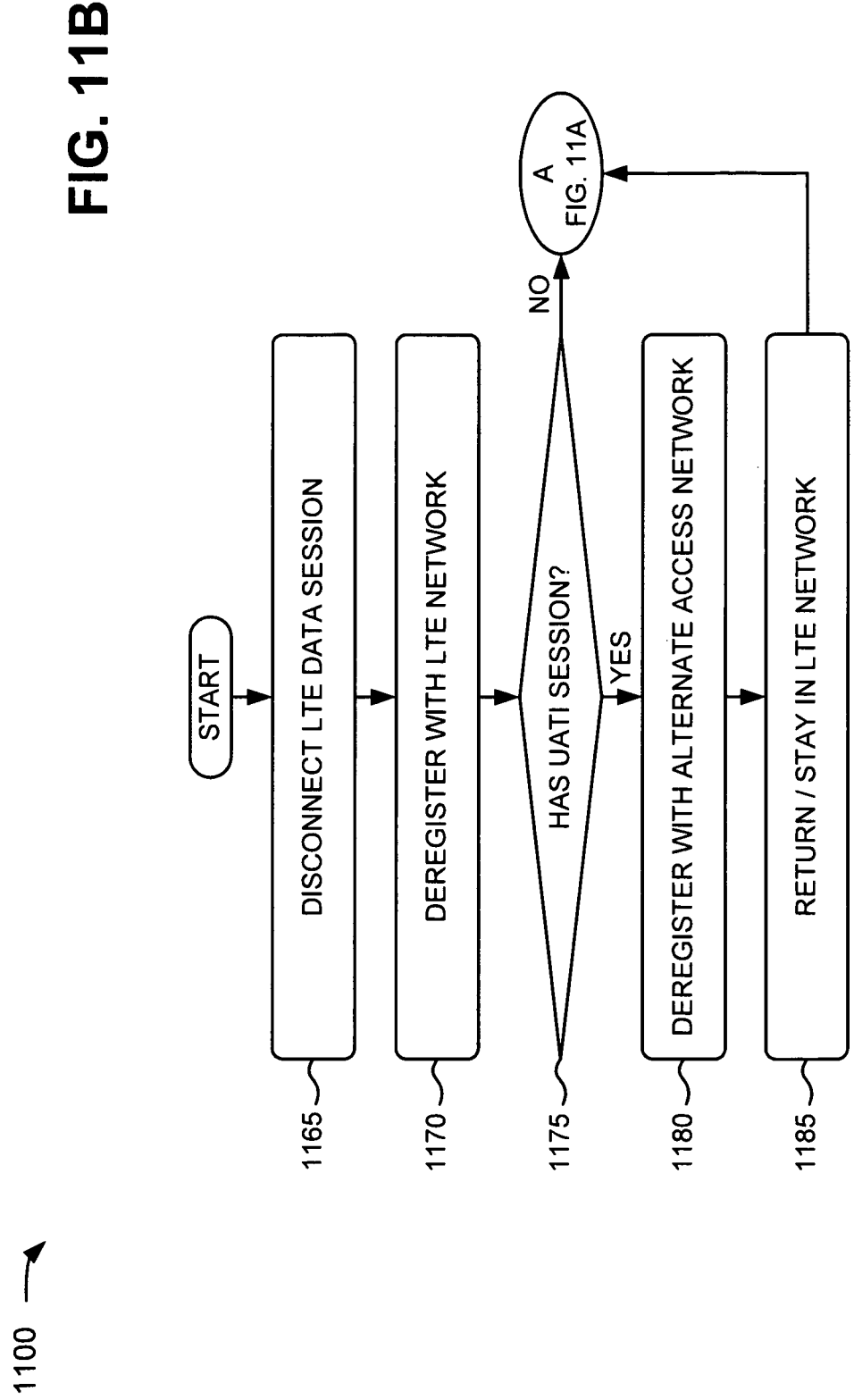

FIGS. 11A and 11B depict flow charts of still another exemplary process 1100 for detecting, selecting, acquiring, and maintaining attachment with a LTE network according to implementations described herein. In one implementation, process 1100 may be performed by user equipment 110. In other implementations, some or all of process 1100 may be performed by another device or group of devices (e.g., communicating with user equipment 110), such as one or more components of LTE network 120.

As illustrated in FIG. 11A, process 1100 may begin with user equipment checking for an LTE network (block 1105), and determining whether the user equipment is in a coverage area provided by the LTE network (block 1110). For example, in implementations described above in connection with FIG. 8, user equipment 110 may power up and may reference a HOL for access systems. In one example, user equipment 110 may reference the HOL for a preferred or primary access system (e.g., LTE network 120) and an alternate access system (e.g., a PLMN for CDMA/eHRPD network 140). The HOL may direct user equipment 110 to search for LTE network 120 and user equipment 110 may search for LTE network 120, as indicated by reference number 810. User equipment 110 may determine if it in a coverage area provide by LTE network 120.

As further shown in FIG. 11A, if the user equipment is not in the LTE coverage area (block 1110—NO), the user equipment may check for an alternate access network and/or may acquire a UATI (block 1115) and may return to the LTE network (block 1120). Otherwise (block 1110—YES), the user equipment may acquire the LTE network (block 1125). For example, in implementations described above in connection with FIG. 8, if user equipment 110 is within the coverage area associated with LTE network 120, user equipment 110 may reference the PLMN to detect and acquire LTE network 120, as indicated by reference number 820. If user equipment 110 is not within the coverage area associated with LTE network 120, user equipment 110 may detune one radio and may reference the preferred roaming list (PRL) to begin a search for an alternate access system (e.g., CDMA/eHRPD network 140), as indicated by reference number 860. User equipment 110 may request and receive UATI 870 from CDMA/eHRPD network 140.

Returning to FIG. 11A, the user equipment may determine whether to initiate a service (block 1130). If the user equipment initiates the service (block 1130—YES), the user equipment may attach to the LTE network (block 1140) and may start a service application (block 1145). For example, in implementations described above in connection with FIG. 8, after acquisition of LTE network 120, user equipment 110 may initiate service request 830 for a service (e.g., Internet services, IMS services, voice services, etc.) provided by network 150. User equipment 110 may attach to LTE network 120, as indicated by reference number 840, and LTE network 120 may provide service request 830 to network 150. In response to service request 830, network 150 may provide the requested service 850 to user equipment 110 via LTE network 120.

As further shown in FIG. 11A, it may be determine whether a C/I ratio associated with the LTE network is less than a second threshold (block 1150). If the C/I ratio is not less than the second threshold (block 1150—NO), the user equipment may remain in the LTE network (block 1135). If the C/I ratio is less than the second threshold (block 1150—YES), the user equipment may determine whether the C/I ratio is less than a first threshold (block 1155). If the C/I ratio is not less than the first threshold (block 1155—NO), the user equipment may check for an alternate access network and/or may acquire a UATI (block 1115). If the C/I ratio is less than the first threshold (block 1155—YES), the user equipment may handover to the alternate access network (block 1160).

For example, in implementations described above in connection with FIG. 8, user equipment 110 may receive C/I ratio 880 from LTE network 120. If C/I ratio 880 remains equal to or above the second operational threshold, user equipment 110 may remain attached to LTE network 120 and may continue to receive service 850. If C/I ratio 880 is below the second operational threshold, user equipment 110 may cease receiving service 850 and may determine if C/I ratio 880 is above the first operational threshold. If C/I ratio 880 remains equal to or above the first operational threshold, user equipment 110 may search for an alternate access network (e.g., CDMA/eHRPD network 140) 860, may acquire UATI 870 from CDMA/eHRPD 140, and may return to LTE network 120. If C/I ratio 880 is below the first operational threshold for a specified time, MIMO may no longer function. Thus LTE network 120 may not function and user equipment 110 may attach to an alternate access system (e.g., CDMA/eHRPD network 140), as indicated by reference number 890. User equipment 110 may remain attached to CDMA/eHRPD network 140 for a specified time and may search for LTE network 120 and C/I ratio 880 before attempting to reacquire LTE network 120. If user equipment 110 detects a sufficient C/I ratio 880 for LTE MIMO operation, user equipment 110 may reacquire LTE network 120 and may reattach to LTE network 120.

As shown in FIG. 11B, the user equipment may disconnect from a LTE data session (block 1165), may deregister with the LTE network (block 1170), and may determine if there is a UATI session (block 1175). For example, in implementations described above in connection with FIGS. 6 and 8, if user equipment 110 is attached to LTE network 120 and disconnects 610 a data session with network 150 (e.g., user equipment 110 stops receiving service 850 provided by network 150), user equipment 110 may request LTE network 120 to deregister 620 user equipment 110 from LTE network 120. User equipment 110 may determine if it is maintaining a UATI (e.g., UATI 870).

As further shown in FIG. 11B, if there is no UATI session (block 1175—NO), the user equipment may return to block 1130 (FIG. 11A). Otherwise (block 1175—YES), the user equipment may deregister with the alternate access network (block 1180) and may return to or stay in the LTE network (block 1185). For example, in implementations described above in connection with FIGS. 6 and 8, if user equipment 110 is not maintaining UATI 870, user equipment 110 may return to LTE network 1120 may initiate another service request 830. If user equipment 110 is maintaining UATI 870, user equipment 110 may request CDMA/eHRPD network 140 to deregister 630 user equipment 110 from CDMA/eHRPD network 140. User equipment 110 may return to the HOL for directions and may return to or stay in the LTE network 120.

Implementations described herein may provide systems and/or methods that enable user equipment to attach to an access system (e.g., a LTE network) only when the user equipment attempts to perform some activity via the LTE network (e.g., access the Internet, request a service via the Internet, etc.). Such an arrangement may prevent consumption and waste of resources (e.g., MME/S-GWs, base stations, etc.) associated with unnecessary access of the LTE network. The systems and/or methods may reduce access system acquisition time and may ensure accessibility to fallback access systems (e.g., CDMA systems).

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 9A-11B, the order of the blocks may be modified in other implementations. Further, non-dependent blocks may be performed in parallel.

It will be apparent that exemplary aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method in a radio network that includes a device, the method comprising:

searching, via the device, for a primary access network;

acquiring, via the device, the primary access network to form an association between the device and the primary access network;
requesting, via the device, a service provided by a network connected to the primary access network;
attaching, via the device, to the primary access network only when the service is requested by the device;
determining whether a carrier-to-interference (C/I) ratio associated with the primary access network is greater than or equal to a first threshold;
maintaining the association between the device and the primary access network when the C/I ratio is greater than or equal to the first threshold;
determining whether the C/I ratio is greater than or equal to a second threshold when the C/I ratio is less than the first threshold;
searching for an alternate access network when the C/I ratio is greater than or equal to the second threshold; and
attaching the device to the primary access network when the C/I ratio is less than the second threshold.

2. The method of claim 1, where searching for the primary access network comprises:
determining whether the device is within a coverage area associated with the primary access network; and
searching for the alternate access network when the device is outside the coverage area associated with the primary access network;
where the primary access network is based on the device being within the coverage area associated with the primary access network.

3. The method of claim 1, further comprising:
maintaining the association between the device and the primary access network when the device does not attach to the primary access network.

4. The method of claim 1, further comprising:
receiving, by the device, the service provided by the network; and
maintaining the association between the device and the primary access network when the service is received by the device.

5. The method of claim 4, further comprising:
determining the device to be in an idle operational mode when the service is no longer received by the device; and
searching for the alternate access network when the device is in the idle operational mode.

6. The method of claim 1, where the alternate access network comprises one or more of:
a Global System for Mobile communications (GSM) based network;
a Universal Mobile Telecommunications System (UMTS) based network,
a code division multiple access (CDMA) network, or
an evolved high rate packet data (eHRPD) network.

7. The method of claim 1, further comprising:
disconnecting, after attaching to the primary access network, a data session between the device and the network; and
deregistering the device with the primary access network.

8. The method of claim 7, further comprising:
determining whether the device is associated with the alternate access network;
deregistering the device with the alternate access network when the device is associated with the alternate access network; and
associating the device with the primary access network.

9. The method of claim 1, where the primary access network comprises a long term evolution (LTE) network.

10. The method of claim 1, where the network comprises one or more of:
a local area network (LAN),
a wide area network (WAN),
a metropolitan area network (MAN),
an intranet,
the Internet,
a public land mobile network (PLMN),
a telephone network, or
an Internet Protocol Multimedia Subsystem (IMS) network.

11. A method in a radio network that includes a device, the method comprising:
searching, via the device, for a primary access network;
determining, via the device, whether a carrier-to-interference (C/I) ratio associated with the primary access network is greater than or equal to a threshold;
acquiring, via the device, the primary access network when the C/I ratio is greater than or equal to the threshold;
acquiring, via the device, an alternate access network when the C/I ratio is less than the threshold;
initiating, via the device, a request for a service provided by a network connected to the primary access network; and
attaching, via the device, to the primary access network based on initiating the request.

12. The method of claim 11, where acquiring the alternate access network comprises:
determining whether the C/I ratio is greater than or equal to a second threshold for a particular period of time;
acquiring the alternate access network when the C/I ratio is less than the second threshold for the particular period of time; and
maintaining an association between the device and the primary access network when the C/I ratio is less than the second threshold for the particular period of time.

13. The method of claim 12, further comprising:
re-determining, after attaching to the primary access network, whether the C/I ratio is greater than or equal to the threshold; and
attaching the device to the alternate access network when the C/I ratio is re-determined to be less than the threshold.

14. The method of claim 11, further comprising:
determining whether the device is idle for more than a particular time period;
acquiring the alternate access network when the device is idle for the particular period of time; and
maintaining an association between the device and the primary access network when the device is idle for the particular period of time.

15. The method of claim 14, further comprising:
re-determining whether the C/I ratio is greater than or equal to the threshold; and
attaching the device to the alternate access network when the C/I ratio is re-determined to be less than the threshold.

16. A device, comprising:
a memory to store a plurality of instructions; and
a processor to execute instructions in the memory to:
search for a primary access network,
determine whether a carrier-to-interference (C/I) ratio associated with the primary access network is greater than or equal to a first threshold,
determine whether the C/I ratio is greater than or equal to a second threshold when the C/I ratio is less than the first threshold, search for an alternate access network when the C/I ratio is greater than or equal to the second threshold, acquire the primary access network when the C/I ratio is greater than or equal to the first threshold, request a service provided by a network connected to the device via the primary access network after acquiring the primary access network, and attach to the primary access network based on requesting the service.

17. The device of claim 16, where the processor is further to execute instructions in the memory to:

maintain an association between the device and the primary access network when the device does not acquire the network.

18. The device of claim 16, where the processor is further to execute instructions in the memory to:

receive the service provided by the network, and maintain an association between the device and the primary access network when the service is received by the device.

19. The device of claim 16, where the processor is further to execute instructions in the memory to:

determine the device to be in an idle operational mode after the service is received by the device, and search for the alternate access network when the device is determined to be in the idle operational mode.

20. The device of claim 16, where the service is associated with a data session between the device and the network and where the processor is further to execute instructions in the memory to:

disconnect the data session, deregister the device with the primary access network, determine whether the device is associated with the alternate access network, deregister the device with the alternate access network when the device is associated with the alternate access network and after disconnecting the data session, and associate the device with the primary access network.

21. The device of claim 16, where the primary access network comprises a long term evolution (LTE) network.

22. The device of claim 16, where the alternate access network comprises one or more of:

a Global System for Mobile communications (GSM) based network;

a Universal Mobile Telecommunications System (UMTS) based network, a code division multiple access (CDMA) network, or an evolved high rate packet data (eHRPD) network.

23. The device of claim 16, where the network comprises one or more of:

a local area network (LAN), a wide area network (WAN), a metropolitan area network (MAN), an intranet, the Internet, a public land mobile network (PLMN), a telephone network, or an Internet Protocol Multimedia Subsystem (IMS) network.

* * * * *